Oct. 10, 1944.   J. O. ALMEN   2,360,187
TORQUE LIMITING CLUTCH
Filed May 24, 1943

Inventor
John O. Almen
By Blackmore, Spencer & Flint
Attorneys

Patented Oct. 10, 1944

2,360,187

UNITED STATES PATENT OFFICE 2,360,187

TORQUE LIMITING CLUTCH

John O. Almen, Royal Oak, Mich., assignor to General Motors Corporation, Detroit, Mich., a corporation of Delaware Application May 24, 1943, Serial No. 488,107

8 Claims. (Cl. 64—30)

This invention relates to a torque limiting or overload release clutch.

One object of the invention is a coil spring clutch of the foregoing kind.

A more specific object of the invention is a torque limiting coil spring clutch which will transmit a limited torque in either direction between two members, no matter which of the two members is the driving member and which the driven member.

The above and other objects of the invention will be apparent as the description proceeds.

According to the invention, the torque is transmitted from the driving to the driven member through a tightened coil spring and a pre-twisted plate spring in series, and the plate spring is operative to slacken the coil spring and cause slipping of the clutch as it is untwisted and straightened under overload. The coil spring has a small initial degree of frictional drag on one of the driving and driven members, and the pre-twisted plate, which constitutes a torque limiting spring, is positively driven by the other of the driving and driven members.

The arrangement is such that upon a small degree of relative movement between the driving and driven members, a lug at one end of the torque limiting spring engages one end of the coil spring to move it in a direction to increase its frictional drag on the member with which it is associated and transmit the required torque. Whenever the torque thus transmitted increases or tends to increase beyond the capacity of the torque limiting spring, there is a further small degree of relative movement between the driving and driven members accompanied by a straightening or flattening of the torque limiting spring, while a lug at the opposite end thereof engages the other end of the coil spring to move it in a direction to reduce its frictional drag on the member with which it is associated and permit the clutch to slip.

The drawing shows a structure according to the invention in which the driving and driven members are a pair of shafts, the ends of which form concentric internal and external members with an annular space for a coil spring therebetween.

The coil spring is associated with the external member, and a torque limiting spring is associated with the internal member, there being a lug at one end of the torque limiting spring to expand the coil spring into tighter driving engagement with the external member, and a lug at the other end of the torque limiting spring to contract the coil spring and reduce its frictional drag on the external member to permit slipping of the clutch.

Figure 1:
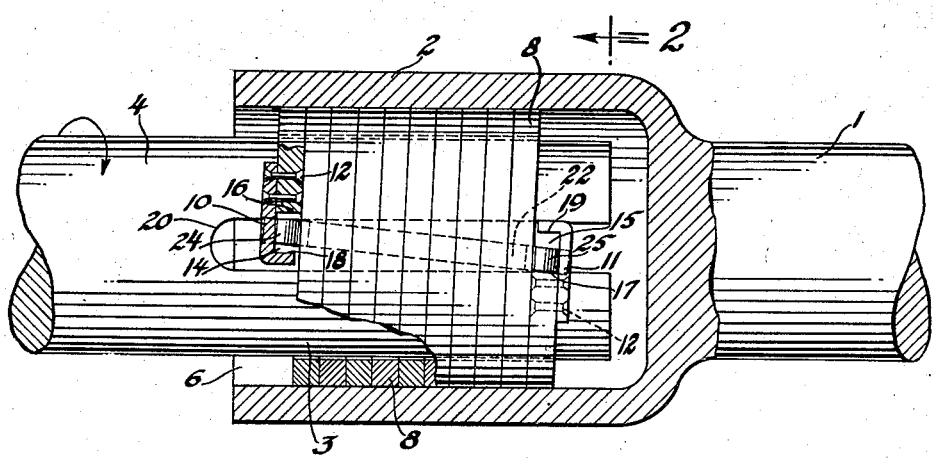
Figure 1 is a part sectional view of the structure.

The end of the shaft 1 is provided with a sleeve portion 2, which constitutes an external clutch member concentric with an internal clutch member constituted by the end 3 of the shaft 4. Between the external and internal members 2 and 3 thus provided, there is an annular space 6 for a coil spring 8.

The outer peripheral surface of the coil spring 8 engages the inner periphery of the external member 2 with a slight frictional fit, while there is clearance between the inner peripheral surface of the coil spring and the internal member 3.

The opposite ends of the coil spring 8 are provided with hooked extensions 10 and 11 which are secured thereto by rivets such as 12 to form slots 14 and 15, with end faces 16 and 17 constituted by the ends of the coil spring 8, and opposite end faces 18 and 19 constituted by the extensions 10 and 11.

There is a longitudinal slot 20 in the internal member 3, for a torque limiting spring which consists of a pre-twisted plate 22. The width of the slot 20 is greater than the thickness of the material of the plate spring 22, but is preferably such that the plate spring is forced to assume a less twisted contour as it is inserted in the slot 20 and is therefore preloaded to that extent.

Lugs 24 and 25 at the opposite ends of the plate spring 22 project into the slots 14 and 15 at the opposite ends of the coil spring 8. There is clearance between the lug 24 and the opposite end faces 16 and 18 of the slot 14, and between the lug 25 and the opposite end faces 17 and 19 of the slot 15.

Figure 2:
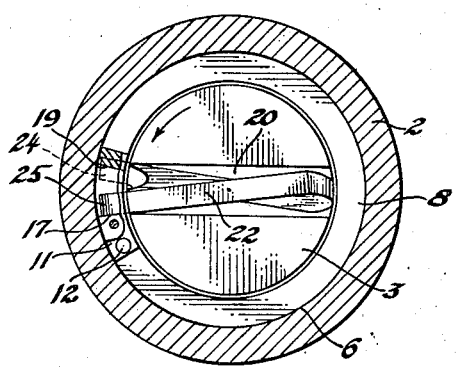
Figure 2 is a view on line 2—2 of Figure 1.
Figure 3:
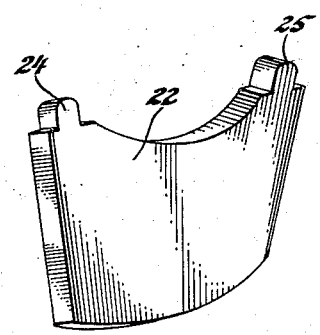
Figure 3 is a perspective view of the torque limiting spring element of Figures 1 and 2.

If now, for example, it is assumed that the shaft 4 is the driving member turning in the direction of the arrows in Figures 1 and 2, the lug 25 of the plate spring 22 will bear against the end face 17 of the slot 15 and the coil spring 8, and expand the coils thereof into tighter driving engagement with the external member 2, and thus transmit torque to the driven shaft 1. If the torque transmitted exceeds the pre-loading of the torque limiting plate spring 22, the latter will be deflected to a more nearly flat condition. As this occurs, the lug 24 of the plate spring 22 will bear against the end face 18 of the slot 14 and contract the coils of the spring 8 and reduce its frictional drag on the external member 2 to permit slipping of the clutch.

It will be evident that the same action will take place if the shaft 1 instead of the shaft 4 is the driving member and is turned in a direction opposite to the direction of the arrows in Figures 1 and 2, and even if these alternative driving members are turned in directions opposite to those indicated, except that in the latter event the lug 24 will expand the coils of the spring 8 into tighter driving engagement, and upon overload the lug 25 will contract the coils of the spring 8 to permit slipping of the clutch.

I claim:

1. A clutch including driving and driven members, a coil spring engaging one of said members with a slight frictional fit, and a pre-twisted plate spring in a slot in the other of said members, said plate spring being adapted to engage one end of said coil spring and move it in a direction to tighten its engagement and transmit the drive, and upon untwisting deflection thereof under overload to engage the other end of said coil spring and move it in a direction to slacken its engagement and permit slipping of the clutch.

2. The combination according to claim 1, in which one of said driving and driven members is a sleeve around the other of said members, and there is an annular space for the coil spring therebetween, said coil spring being expanded by the pre-twisted plate spring to tighten its engagement with the inner periphery of said sleeve.

3. The combination according to claim 1, in which said slot is greater in width than the thickness of the material of the pre-twisted plate spring, said plate spring being pre-loaded by forcing it to assume a less twisted contour in said slot.

4. The combination according to claim 1, in which there are lugs towards the opposite ends of said pre-twisted plate spring and slots in the opposite ends of said coil spring, said lugs entering said slots and effecting the said engagements of said plate spring with opposite ends of said coil spring.

5. A clutch including driving and driven members, a coil spring engaging one of said members with a slight frictional fit, and a pre-twisted plate spring in a slot in the other of said members, the opposite ends of said plate spring loosely engaging opposite ends of said coil spring, whereby, after a small degree of relative movement between said driving and driven members, one end of said plate spring will move one end of said coil spring in a direction to tighten its engagement with that member with which it is associated and transmit the drive between said driving and driven members, and upon overload when the torque thus transmitted is sufficient to untwist and flatten said plate spring accompanied by a further small degree of relative movement between said driving and driven members, the other end of said plate spring will move the other end of said coil spring in a direction to slacken its engagement with that member with which it is associated to permit slipping of said clutch.

6. A clutch including concentric driving and driven members with an annular space therebetween, a friction band in said space having peripheral frictional engagement with one of said members, and torque transmitting and limiting means forming a resiliently yieldable driving connection between said band and the other of said members; said means being carried by said last-named member and loosely engaging opposite ends of said friction band and being adapted, after a small degree of relative movement between said driving and driven members, to engage and move one end of said friction band in a direction to tighten its engagement with that member with which it is associated and transmit the drive between said driving and driven members, and upon overload accompanied by a further small degree of relative movement between said driving and driven members to engage and move the other end of said friction band in a direction to slacken its engagement with that member with which it is associated to permit slipping of said clutch.

7. A clutch including concentric driving and driven members with an annular space therebetween, a friction band in said space having peripheral frictional engagement with one of said members, and torque transmitting and limiting means forming a driving connection between said band and the other of said members; said means being carried by said last-named member and loosely engaging opposite ends of said friction band and being adapted, after a small degree of relative movement between said driving and driven members, to engage and move one end of said friction band in a direction to tighten its engagement with that member with which it is associated and transmit the drive between said driving and driven members, and upon overload accompanied by a further small degree of relative movement between said driving and driven members to engage and move the other end of said friction band in a direction to slacken its engagement with that member with which it is associated to permit slipping of said clutch, in which said torque transmitting and limiting means is a spring mounted between opposed faces on the member by which it is carried.

8. A clutch including concentric driving and driven members with an annular space therebetween, a friction band in said space having peripheral friction engagement with one of said members, and torque transmitting and limiting means forming a driving connection between said band and the other of said members; said means being carried by said last-named member and loosely engaging opposite ends of said friction band and being adapted, after a small degree of relative movement between said driving and driven members, to engage and move one end of said friction band in a direction to tighten its engagement with that member with which it is associated and transmit the drive between said driving and driven members, and upon overload accompanied by a further small degree of relative movement between said driving and driven members to engage and move the other end of said friction band in a direction to slacken its engagement with that member with which it is associated to permit slipping of said clutch, in which said torque transmitting and limiting means is a pre-loaded spring mounted between opposed faces on the member by which it is carried.

JOHN O. ALMEN.